(12) United States Patent
Eriksson

(10) Patent No.: US 6,971,670 B1
(45) Date of Patent: Dec. 6, 2005

(54) AIR-BAG SYSTEM FOR VEHICLES

(75) Inventor: Dick Eriksson, Alingsås (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/049,040

(22) PCT Filed: Aug. 11, 2000

(86) PCT No.: PCT/SE00/01571

§ 371 (c)(1),
(2), (4) Date: Feb. 8, 2002

(87) PCT Pub. No.: WO01/12474

PCT Pub. Date: Feb. 22, 2001

(30) Foreign Application Priority Data

Aug. 12, 1999 (GB) .................................... 9919067

(51) Int. Cl.[7] .............................................. B60R 21/28
(52) U.S. Cl. ................................................... 280/739
(58) Field of Search ............................. 280/731, 732, 280/739, 740

(56) References Cited

U.S. PATENT DOCUMENTS

| | | | | |
|---|---|---|---|---|
| 3,481,625 A | * | 12/1969 | Chute | 280/739 |
| 3,527,475 A | * | 9/1970 | Carey et al. | 280/739 |
| 3,758,133 A | | 9/1973 | Okada | |
| 3,795,414 A | * | 3/1974 | Ventre et al. | 280/730.1 |
| 3,929,350 A | * | 12/1975 | Pech | 280/729 |
| 4,169,613 A | * | 10/1979 | Barnett | 280/739 |
| 4,840,397 A | * | 6/1989 | Katz et al. | 280/739 |
| 4,963,412 A | * | 10/1990 | Kokeguchi | 428/137 |
| 5,007,662 A | * | 4/1991 | Abramczyk et al. | 280/739 |
| 5,018,761 A | | 5/1991 | Henseler | |
| 5,447,330 A | * | 9/1995 | Tagawa et al. | 280/739 |
| 5,492,363 A | * | 2/1996 | Hartmeyer et al. | 280/739 |
| 5,542,695 A | * | 8/1996 | Hanson | 280/729 |
| 5,704,639 A | * | 1/1998 | Cundill et al. | 280/739 |
| 5,911,436 A | * | 6/1999 | Berger | 280/739 |
| 6,471,244 B1 | * | 10/2002 | Nishijima et al. | 280/742 |
| 6,554,313 B2 | * | 4/2003 | Uchida | 280/729 |

FOREIGN PATENT DOCUMENTS

| | | |
|---|---|---|
| DE | 42 35 761 | 4/1994 |
| EP | 0 398 028 | 11/1990 |
| GB | 2 261 409 | 5/1993 |

* cited by examiner

*Primary Examiner*—Paul N. Dickson
*Assistant Examiner*—Laura B. Rosenberg
(74) *Attorney, Agent, or Firm*—Venable LLP; Robert Kinsberg; Thomas G. Wiseman

(57) ABSTRACT

An air-bag arrangement incorporating an air-bag (6) and means adapted to inflate the air-bag, so that the air-bag occupies a position generally in front of an occupant (2) of a front seat of the vehicle, and between the occupant (2) of the front seat of the vehicle and the windscreen or windshield (5) of the vehicle, that part of the air-bag (6) located to contact the interior of the windshield (5), when the air-bag (6) is inflated being provided with gas outlet means to inject gas, under pressure, between part of the air-bag and the inside surface of the windscreen or windshield (5).

4 Claims, 5 Drawing Sheets

AIR-BAG SYSTEM FOR VEHICLES

BACKGROUND OF THE INVENTION

1. Field of the Invention

The present invention relates to an air-bag arrangement, and more particularly relates to an air-bag arrangement provided in a motor vehicle to give protection to an occupant of a front seat of the vehicle, such as the driver or a front seat passenger of the vehicle.

2. Description of the Prior Art

It has been proposed previously to provide an air-bag adapted to be inflated in the event that an accident should arise, the inflated air-bag being located in front of the driver or front seat passenger in a motor vehicle, to provide protection for the driver or passenger. A problem with such air-bags is that, in certain situations, when the air-bag has been deployed and the occupant moves forwardly towards the air-bag, as a consequence of deceleration of the vehicle during an accident, the neck of the occupant of the vehicle may be moved rearwardly, relative to the torso, thus injuring the occupant of the vehicle. The present invention seeks to provide an improved air-bag arrangement.

SUMMARY OF THE INVENTION

According to this invention there is provided an air-bag arrangement in a motor vehicle, the air-bag arrangement incorporating an air-bag initially stored within a housing, and means adapted to inflate the air-bag, so that the air-bag, when inflated, occupies a position generally in front of an occupant of a front seat of the vehicle, and between the occupant of the front seat of the vehicle and the windscreen or windshield of the vehicle, the air-bag being provided with a first region adapted to contact or lie immediately adjacent the interior of the windshield when the air-bag is inflated, and a second region located between the first region and the housing, the first region being provided with gas outlet means adapted to eject gas, from the interior of the air-bag, under pressure, to points between the first region of the air-bag and the inside surface of the windscreen or windshield.

Preferably the gas outlet means comprise a plurality of apertures in the air-bag providing a communication between the interior of the air-bag and the exterior of the air-bag.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE PREFERRED EMBODIMENTS

Figure 1:
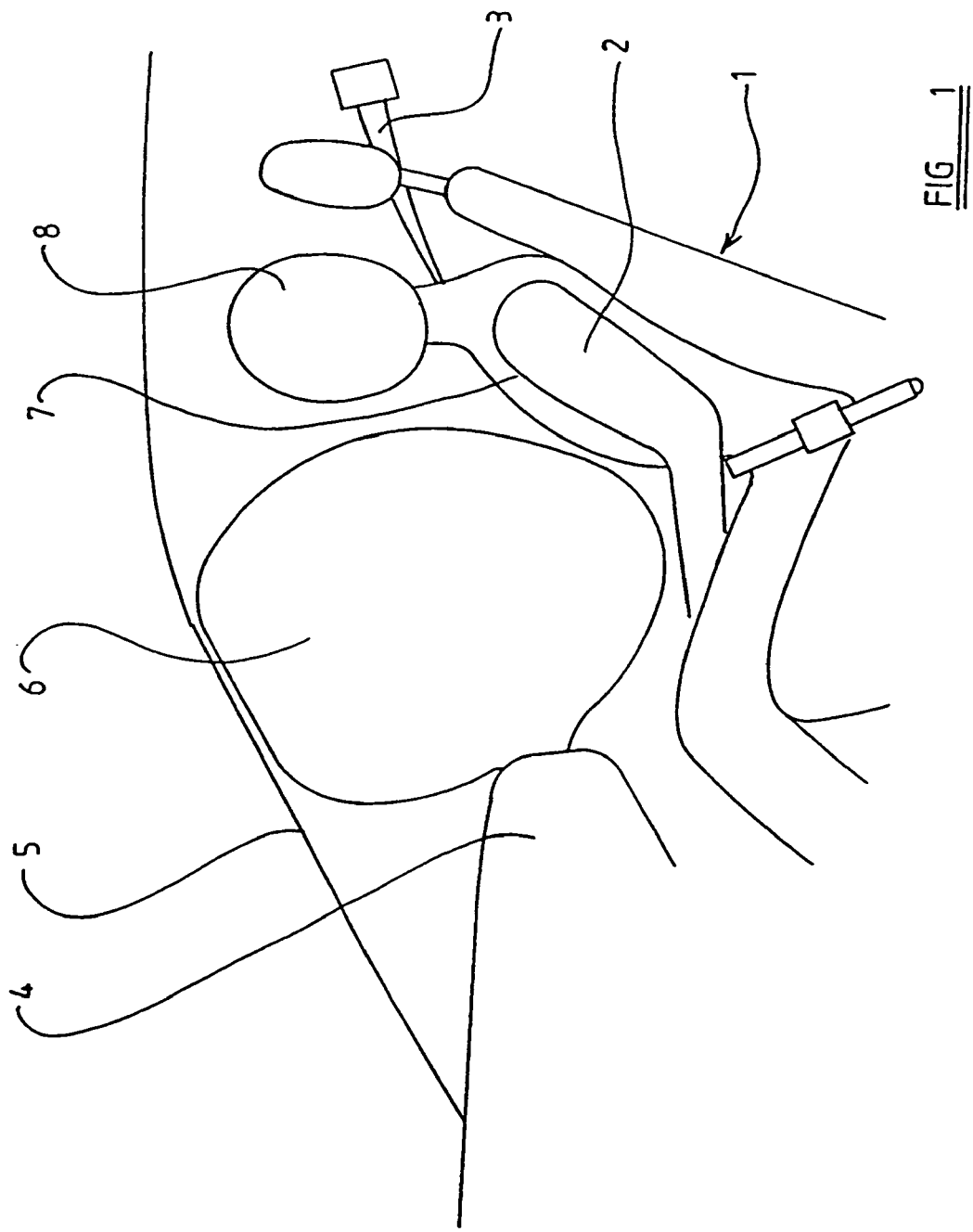
FIG. 1 is a diagrammatic side view illustrating an air-bag, following deployment thereof, at a position in front of a front seat passenger in a motor vehicle.

Referring initially to FIG. 1 of the accompanying drawings, an interior part of a motor vehicle is illustrated. A seat 1, such as the front seat, is provided, and a passenger 2 is located on the front seat. The passenger is retained in an initial position by a seat-belt 3. The vehicle is provided with a dashboard 4 and a windscreen or windshield 5. In FIG. 1, an air-bag 6, of a conventional design, is illustrated, the air-bag having been deployed from the dashboard 4 of the vehicle, as is conventional. The dashboard contains an air-bag housing in which the air-bag is stored before inflation. The inflated air-bag 6 is thus located between the passenger 2 and the dashboard 4 of the vehicle. The air-bag 6 is also located between the occupant 2 and the windscreen 5. It is normal that a section of the air-bag is resting against the windscreen 5.

FIG. 1 thus illustrates the situation that exists shortly after a frontal impact has been detected, and the air-bag 6 has been deployed.

Figure 2:
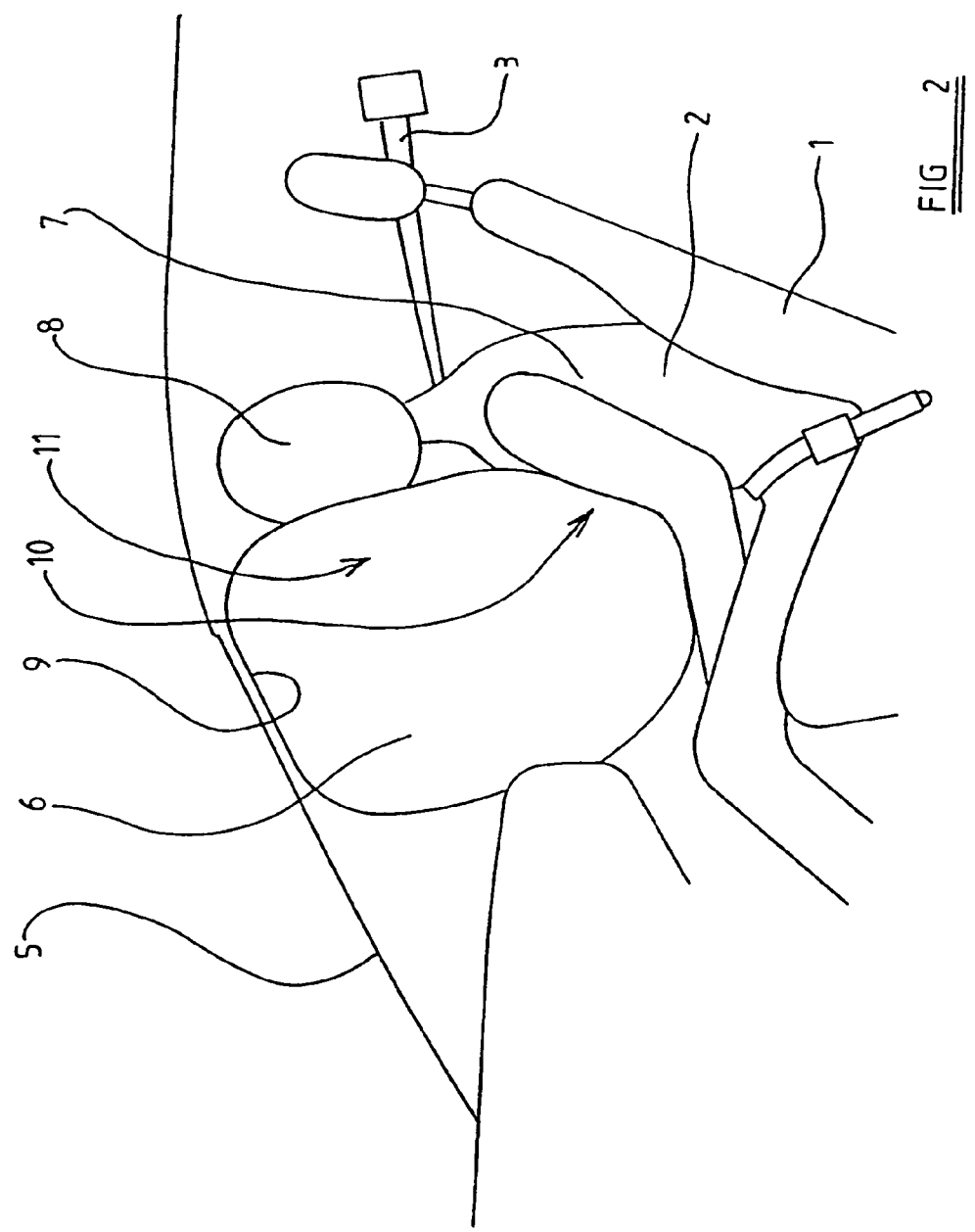
FIG. 2 illustrates the passenger impacting with the air-bag.

Following the detection of the frontal impact and the initial deployment of the air-bag the vehicle will be decelerated, but the occupant 2 will continue to move forwardly, because of the inertia of the torso 7 and head 8 of the occupant. As the occupant continues to move forwardly, the seat-belt 3 will stretch and the torso 7 will impact with the inflated air-bag 6 and the head 8 will also impact with the inflated air-bag 6. This is the situation shown in FIG. 2. The air-bag, when this stage is reached, will be fully inflated. Now a substantial area 9 of the forward section 13 of the air-bag will be pressed against the windscreen 5 located above the dashboard 4, whilst a lower portion 10 of the air-bag will be pressed against the torso 7 of the occupant 2 of the seat 1 of the vehicle.

In a conventional air-bag, because the large surface area 9 is pressed against the windshield 5, there is substantial friction between the area 9 and the windshield 5, and thus the upper part of the inflated air-bag 6 is held stationary in the position that it occupies when inflated, even if subjected to a force that tends to move the air-bag.

Figure 3:
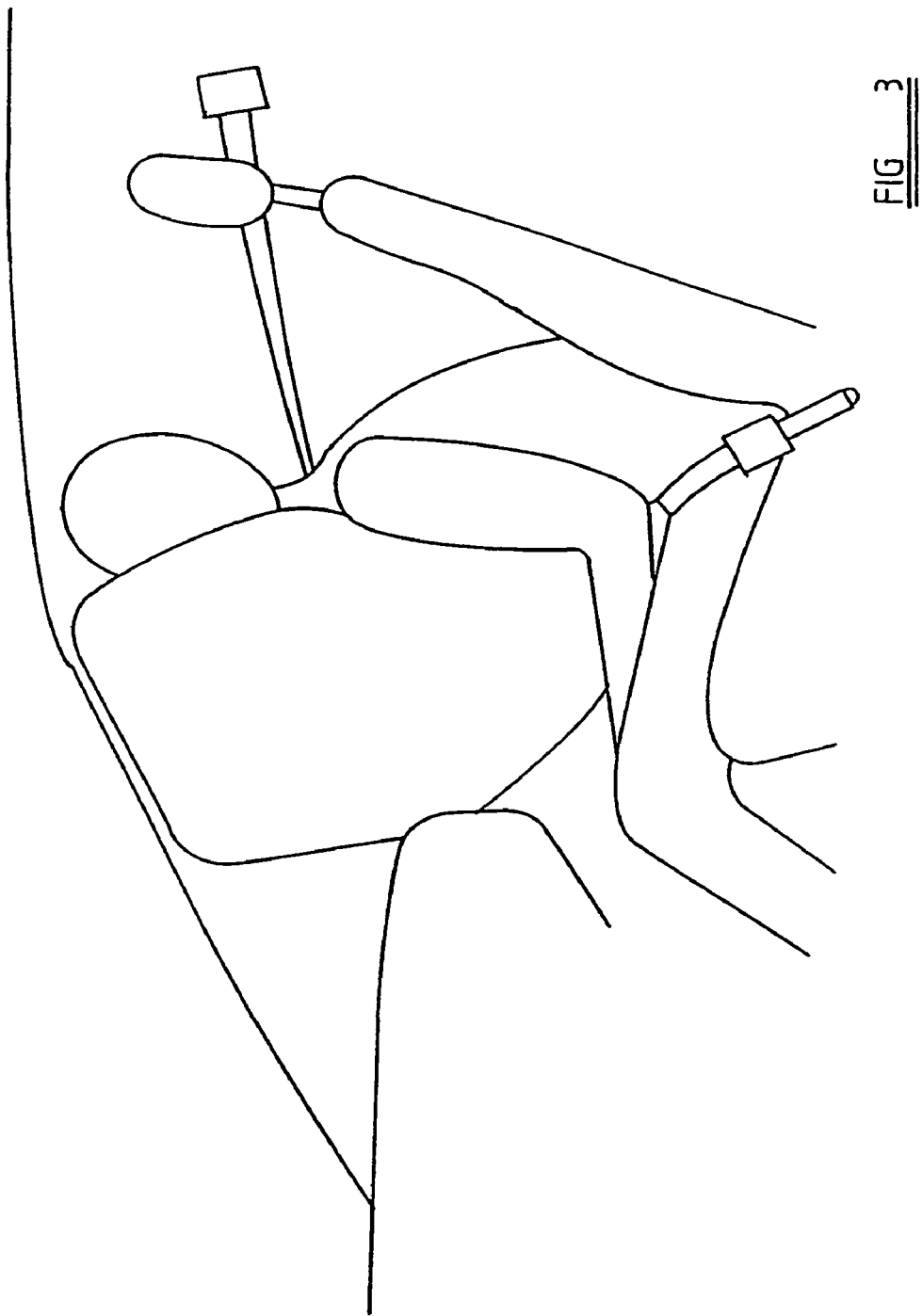
FIG. 3 illustrates the situation that can arise with a prior art air-bag shortly after the occupant has impacted with the air-bag.

The torso 7 of the occupant has a substantial momentum or inertia, and as the vehicle continues to decelerate, the torso 7 moves forwardly relative to the vehicle, compressing the inflated air-bag 6, moving the portion 10 of the air-bag which is at a position remote from the area 9 forwardly. The load on the bag is increased and the pressure on the windscreen is increased thereby. The head 8, of the occupant, does not have such a great inertia, and the head 8 of the occupant engages an upper part 11 of the air-bag which is very close to the region which is held stationary because of the friction existing between the area 9 and the windshield 5. Thus the head 8 tends to be kept relatively stationary, whilst the torso 7 is permitted to move forwardly. This leads to a rearward flexing of the neck of the occupant 2 of the seat 1, as can be seen in FIG. 3. This is undesirable.

Figure 4:
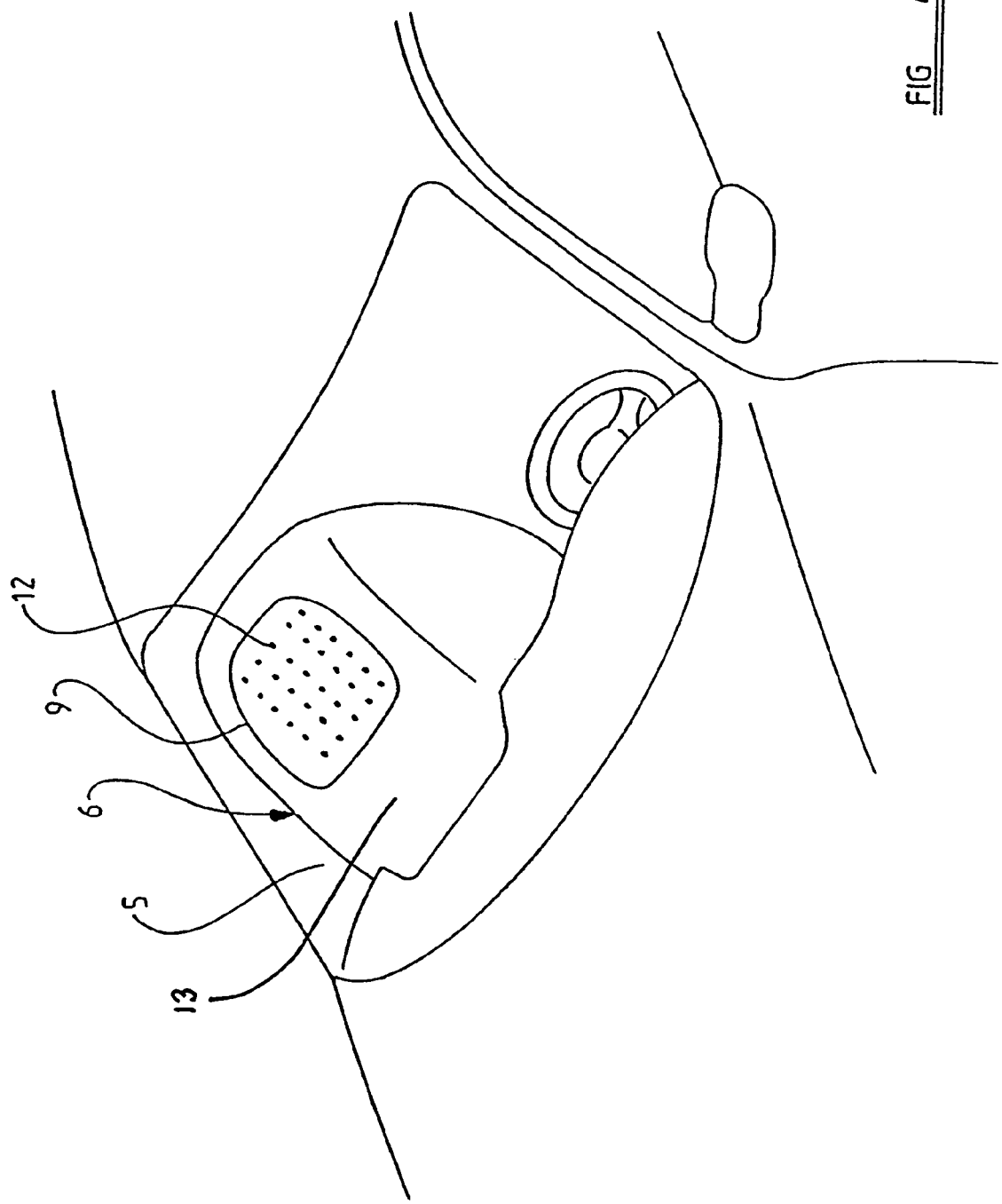
FIG. 4 is a perspective view of a motor vehicle provided with an air-bag in accordance with the invention, with the air-bag in the deployed state.

Turning now to FIG. 4, it is to be appreciated that in the described embodiment of the invention, the air-bag 6 is provided, within the region 9, that is to say the region that is to be pressed against the windshield 5 on inflation of the air-bag 6, with a plurality of small apertures 12. The small apertures 12 provide a communication between the interior of the air-bag and the exterior of the air-bag and thus permit the exit of gas from the interior of the air-bag. The gas is directed towards the inner surface of the windshield 5 and is consequently injected between the surface of the air-bag and the inner surface of the windscreen or windshield 5. This tends to ensure that the air-bag 6 is biased away from the windshield 5. When the pressure in the bag is increased by the occupant moving into the bag more gas will be forced out through the apertures 12. The effect is, in some respects, similar to that of "hovercraft". The high pressure gas ejected from the air-bag between the air-bag and the windscreen or windshield tends to separate the air-bag from the windscreen or windshield which is illustrated by the space 14, thus at least reducing the friction between the airbag and the windscreen or windshield. In a typical situation because the area 9 of the air-bag 6 is spaced slightly from the windshield 5, there is no friction or grip between the air-bag 6 and the windshield 5.

To obtain a best possible reduction of the friction with a minimum of gas leaving the bag, the openings in the area 9 can be arranged asymmetrically, for example, by larger openings in the center or by the openings 12 arranged closer to each other in selected areas.

Figure 5:
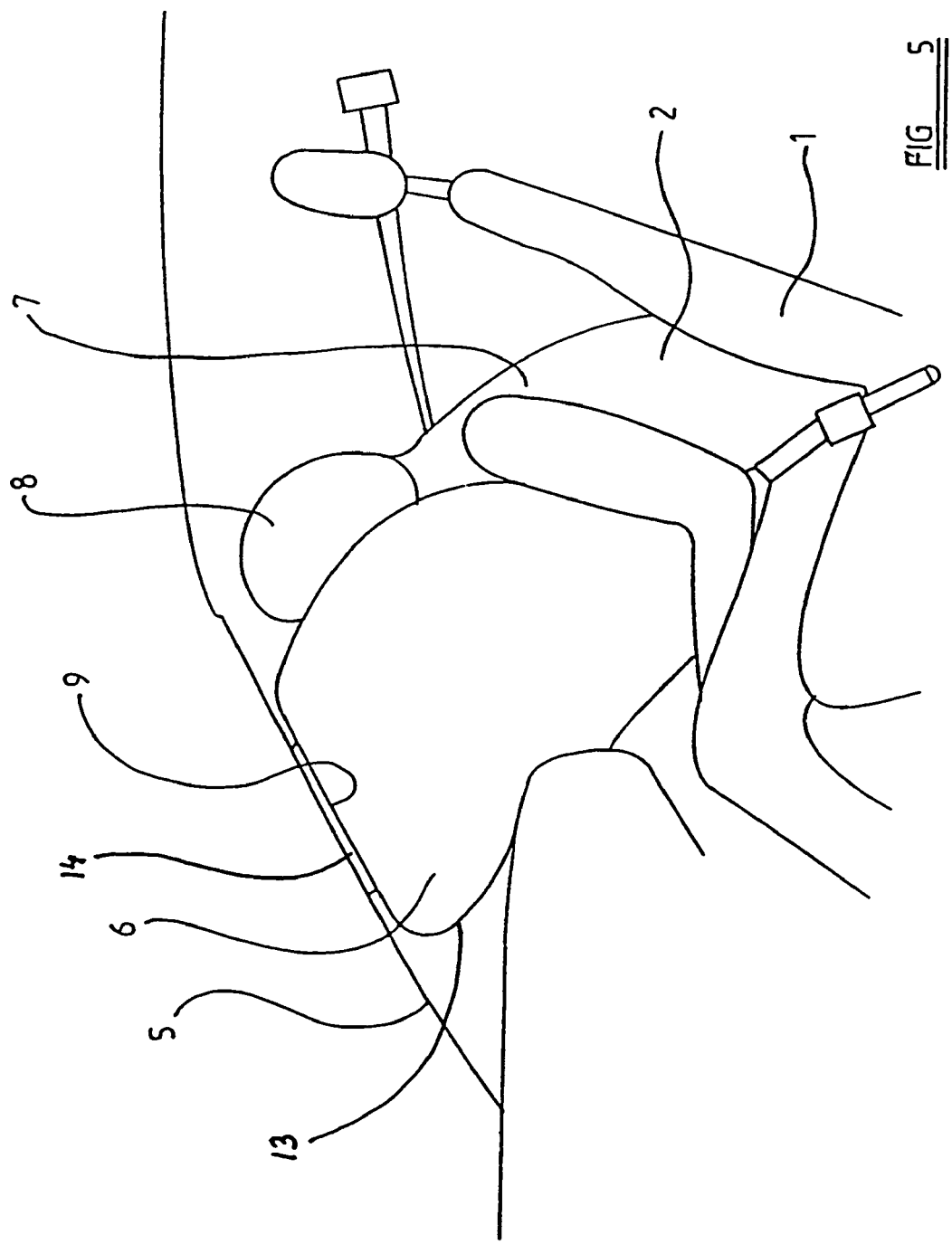
FIG. 5 is a view, corresponding to FIGS. 1 to 3, illustrating the situation that exists shortly after the occupant of the vehicle has impacted with the inflated air-bag of FIG. 4.

Thus, as can be seen from FIG. 5, when the torso 7 and head 8 of the occupant 2 of a seat 1 in a vehicle provided with an air-bag 6 in accordance with the invention impacts with the air-bag, the upper part of the air-bag actually moves forwardly and downwardly in response to the pressure applied thereto by the head 8 of the occupant 2. The area 9 of the air-bag, thus "slides" across the interior surface of the windscreen or windshield 5. Therefore the risk of the neck of the occupant of the vehicle flexing rearwardly is substantially minimised.

Whilst the invention has been described with specific reference to an air-bag provided to protect a front seat passenger in a motor vehicle, it is to be appreciated that in an alternative embodiment of the invention, the air-bag may be intended to protect the driver of the vehicle. In such a situation the air-bag would be initially mounted within the hub of the steering wheel of the vehicle.

In this specification the term "comprising" means "including or consisting of" and the term "comprises" means "includes or consists of".

I claim:

1. An airbag arrangement in a motor vehicle, wherein the motor vehicle has a windshield, comprising:
    an air-bag adapted for being initially stored within an airbag housing, the air-bag having a first surface region and a second surface region; and
    means to inflate the air-bag with gas, so that, when inflated, the air-bag occupies a position between a front seat of the vehicle and the windshield, the first surface region being pressed against the windshield on inflation of the air-bag, and the second surface region being located between the first surface region and the housing;
    wherein, when the air-bag is inflated by the means to inflate, the first surface region contains sufficient gas outlets to eject gas to bias the first surface region away from the interior surface of the windshield.

2. The air-bag arrangement of claim 1, wherein the gas outlets comprises a plurality of apertures in the air-bag, the apertures providing an open-air passage between the interior of the air-bag and the exterior of the air-bag.

3. The air-bag arrangement of claim 2, wherein the apertures are arranged asymmetrically on the first surface region.

4. The air-bag arrangement of claim 2, wherein the apertures are of different sizes.

* * * * *